United States Patent
Oldenettel

(10) Patent No.: US 6,742,775 B2
(45) Date of Patent: Jun. 1, 2004

(54) AIR SPRING WITH TWO PART HOUSING

(75) Inventor: Holger Oldenettel, Resse (DE)

(73) Assignee: Continental Aktiengesellschaft, Hannover (DE)

( * ) Notice: Subject to any disclaimer, the term of this patent is extended or adjusted under 35 U.S.C. 154(b) by 0 days.

(21) Appl. No.: 10/220,567

(22) PCT Filed: Feb. 10, 2001

(86) PCT No.: PCT/EP01/01477

§ 371 (c)(1),
(2), (4) Date: Sep. 3, 2002

(87) PCT Pub. No.: WO01/65139

PCT Pub. Date: Sep. 7, 2001

(65) Prior Publication Data

US 2003/0020218 A1 Jan. 30, 2003

(30) Foreign Application Priority Data

Mar. 1, 2000  (DE) .......................................... 100 09 912

(51) Int. Cl.⁷ ................................................. F16F 9/04
(52) U.S. Cl. ..................... 267/64.21; 267/122; 267/220
(58) Field of Search ................... 280/124.155, 124.147; 267/122, 118, 64.19, 64.21, 64.23, 64.24, 64.26, 64.27, 151, 220

(56) References Cited

U.S. PATENT DOCUMENTS

| 3,046,000 | A | * | 7/1962  | Polhemus et al. | .......... 267/219 |
| 3,376,032 | A | * | 4/1968  | Schmid          | .......... 267/218 |
| 4,555,096 | A | * | 11/1985 | Pryor           | ......... 267/64.21 |
| 4,647,025 | A | * | 3/1987  | Gold            | ......... 267/64.27 |
| 4,655,438 | A | * | 4/1987  | Cameron         | .......... 267/220 |
| 4,768,758 | A | * | 9/1988  | Buma            | ......... 267/64.21 |
| 5,667,203 | A |   | 9/1997  | Römer           |                   |
| 6,382,602 | B1 | * | 5/2002 | Morrow          | ......... 267/64.23 |
| 6,457,702 | B1 | * | 10/2002 | Oishi          | .......... 267/122 |

FOREIGN PATENT DOCUMENTS

| DE | 37 26 923 | 3/1988 |
| FR | 2 574 717 | 6/1986 |
| JP | 60 121337 | 6/1985 |
| JP | 06 228538 | 8/1994 |

* cited by examiner

*Primary Examiner*—Jack Lavinder
*Assistant Examiner*—Benjamin A Pezzlo
(74) *Attorney, Agent, or Firm*—Walter Ottesen

(57) ABSTRACT

An air spring includes a flexible member which, on the one hand, is attached to a housing and, on the other hand, to a roll-off piston and which encloses an air volume. The surface of the housing, which faces toward the air volume of the air spring, is charged with the air pressure of the air volume; and, the air spring can be connected to the chassis of a motor vehicle with the interposition of an elastic bearing. The housing includes at least two parts of which a first part serves as the connection of the air spring to the chassis of a motor vehicle and a second part serves as the attachment of the flexible member; and, the elastic bearing is configured to have an annular shape and is mounted between the two parts of the housing.

5 Claims, 3 Drawing Sheets

AIR SPRING WITH TWO PART HOUSING

FIELD OF THE INVENTION

The invention relates to an air spring which has a flexible member which, on the one hand, is attached to a housing and, on the other hand, to a roll-off piston and encloses an air volume. The surface of the housing, which faces toward the air volume of the air spring, is charged with the air pressure of the air volume and this surface of the housing can be connected to the chassis of the motor vehicle at the housing end with an elastic bearing disposed therebetween.

BACKGROUND OF THE INVENTION

From the state of the art, air spring struts are known (see, for example, U.S Pat. No. 4,712,776) which comprise a shock absorber and an air spring. The air spring is supported at the end of the roll-off piston on the cylinder of the shock absorber. The piston of the shock absorber is insertable into the cylinder and is connected to the housing via an elastic bearing for wobble movement and this permits a pivot movement of the shock absorber relative to the air spring. A further elastic bearing is mounted above the housing of the air spring via which the total air spring strut is connected to the chassis of a motor vehicle. The additional bearing makes possible a pivot movement of the entire air spring strut in its upper region. Because of the pivot movements, transverse forces and thrust stresses, which act on the flexible member of the air spring with the deflections of the air spring, can be reduced and this leads to a longer service life of the flexible member. It is, however, noted that the total force flow of the wheel load passes through the elastic bearing mounted above the housing of the air spring. This must be configured correspondingly large and hard in order to withstand the loading generated by the wheel load. The bearing therefore requires considerable space, which is dimensioned sparingly. Furthermore, the hard configuration of the bearing leads to limits on comfort of the motor vehicle because the air spring of the spring strut as well as the elastic bearing, which is mounted above the housing of the air spring, exhibits a high spring stiffness when there are small vibration amplitudes of the air spring strut. Vibrations having a small vibration amplitudes are therefore poorly cushioned.

SUMMARY OF THE INVENTION

It is an object of the invention to provide an air spring which is suitable for installation in an air spring strut and which air spring has an elastic bearing in the upper region for wobble movement which bearing connects the air spring to the chassis of the motor vehicle and requires little space.

The above object of the invention is realized in that: the housing of the air spring comprises at least two parts of which a first part functions to connect the air spring to the chassis of a motor vehicle and a second part functions to attach the flexible member; and, that the elastic bearing is configured so as to be annular and is mounted between the two parts of the housing.

The elastic bearing connects the two parts of the housing air-tight to each other so that no air from the air volume of the air spring can escape to the outside between the two housing parts. The surface of the first part of the housing, which faces toward the air volume of the air spring, is charged with the air pressure of the air volume of the air spring. The surface of the first part of the housing, which is pressure-effective in the longitudinal direction of the air spring, corresponds in its size preferably approximately to the pressure-effective area of the air spring or is larger. In this way, it is ensured that the total wheel force is compensated by the force which the air pressure in the air volume of the air spring applies to the pressure-effective surface of the first part of the housing which is directed in the longitudinal direction of the air spring. The static wheel load does not operate on the elastic bearing.

The advantage achieved with the invention is especially that the force flow of the wheel load leads directly from the air volume of the air spring to the chassis and, in this way, the elastic bearing of the air spring is no longer loaded completely by the wheel load. For this reason, the elastic bearing can be configured to be small and requires little space. A further advantage of the invention is that the elastic bearing can be configured to be softer because of the lower loading by the wheel load and, in this way, especially vibrations having a small amplitude and a high vibration frequency can be cushioned by the bearing. Thus, the spring characteristic of the air spring is improved for the above-mentioned vibrations.

According to a feature of the invention, the clear diameter of the elastic bearing corresponds approximately to the effective diameter of the air spring. The advantage of this further embodiment is that the elastic bearing is neither subjected to compression nor tension by the air pressure in the air volume of the air spring and is subjected to only a minimum load. In this way, it is possible to configure the elastic bearing to be especially small and especially soft.

According to another feature of the invention, the roll-off piston of the air spring supports itself on a cylinder of a shock absorber whose piston is connected to the second part of the housing and is insertable into the cylinder. Because of the elastic bearing between the first part and the second part of the housing of the air spring, it is ensured that the shock absorber is wobble movable relative to the housing of the air spring in the upper region thereof. For this reason, an elastic bearing is not needed in the region of the attachment of the insertable piston at the second part of the housing.

According to a further feature of the invention, the roll-off piston supports itself on a cylinder of a shock absorber whose piston, which is insertable into the cylinder, is connected directly to the chassis so as to be wobble-movable. The wobble-movable connection of the piston to the chassis takes place preferably via an elastic bearing. The advantage of this embodiment is that the force flow of the dynamic forces is directed directly from the shock absorber to the chassis of the motor vehicle. These dynamic forces operate on the shock absorber with a spring operation of the air spring strut. The force flow does not pass through the elastic bearing, which lies between the two parts of the housing of the air spring, so that these dynamic forces do not have to be considered when designing the elastic bearing. In this way, the space needed to accommodate the elastic bearing can be minimized. Furthermore, the elastic bearing (via which the insertable piston of the shock absorber is connected to the chassis of the motor vehicle) is optimally matched to the dynamic forces acting on the shock absorber.

According to a further feature of the invention, the elastic bearing has a form approximately of an annular section of a spherical surface and is mounted between two flange-like collars of the first and second parts of the housing. The pivot point of the spring in its upper region is then given by the center point of the spherical surface, which is completed starting from the annularly-shaped bearing. The advantage of this embodiment is that the pivot point of the air spring can be precisely fixed in the upper region because of the suggested configuration of the elastic bearing.

According to another feature of the invention, the elastic bearing is in the form of an annular cutout of a spherical surface and is mounted in such a manner between the two parts of the housing that the center point of the spherical surface, which is completed starting from the annularly-shaped bearing, and therefore the pivot point of the air spring strut, lies in the region at which the piston of the shock absorber is connected to the chassis. The advantage of this embodiment is that the spring strut can pivot about this point free of stresses.

According to still another feature of the invention, the elastic bearing comprises an elastomer component. The advantage of this embodiment is that the elastic bearing in the form of an elastomer component can be configured especially simply. Furthermore, an elastic bearing in the form of an elastomer component is especially suitable to place the two parts of the housing air-tight against each other.

A further feature of the invention is characterized in that: the flexible member projects beyond the second part at that end with which it is attached to the second part of the housing; and, that the part of the flexible member, which projects beyond the second part, is attached in such a manner to the first part, that a yielding part of the flexible member remains between the first and second part of the housing and the yielding part defines the elastic bearing.

The advantage of this embodiment is that for the elastic bearing, no separate component need be made available. A further advantage of this embodiment is that the flexible member can be attached to the parts of the housing simply with the aid of clamping rings and this attachment ensures an air-tight connection of the two parts of the housing.

BRIEF DESCRIPTION OF THE DRAWING

The invention will now be explained with reference to the drawings wherein.

DESCRIPTION OF THE PREFERRED EMBODIMENTS OF THE INVENTION

Figure 1:
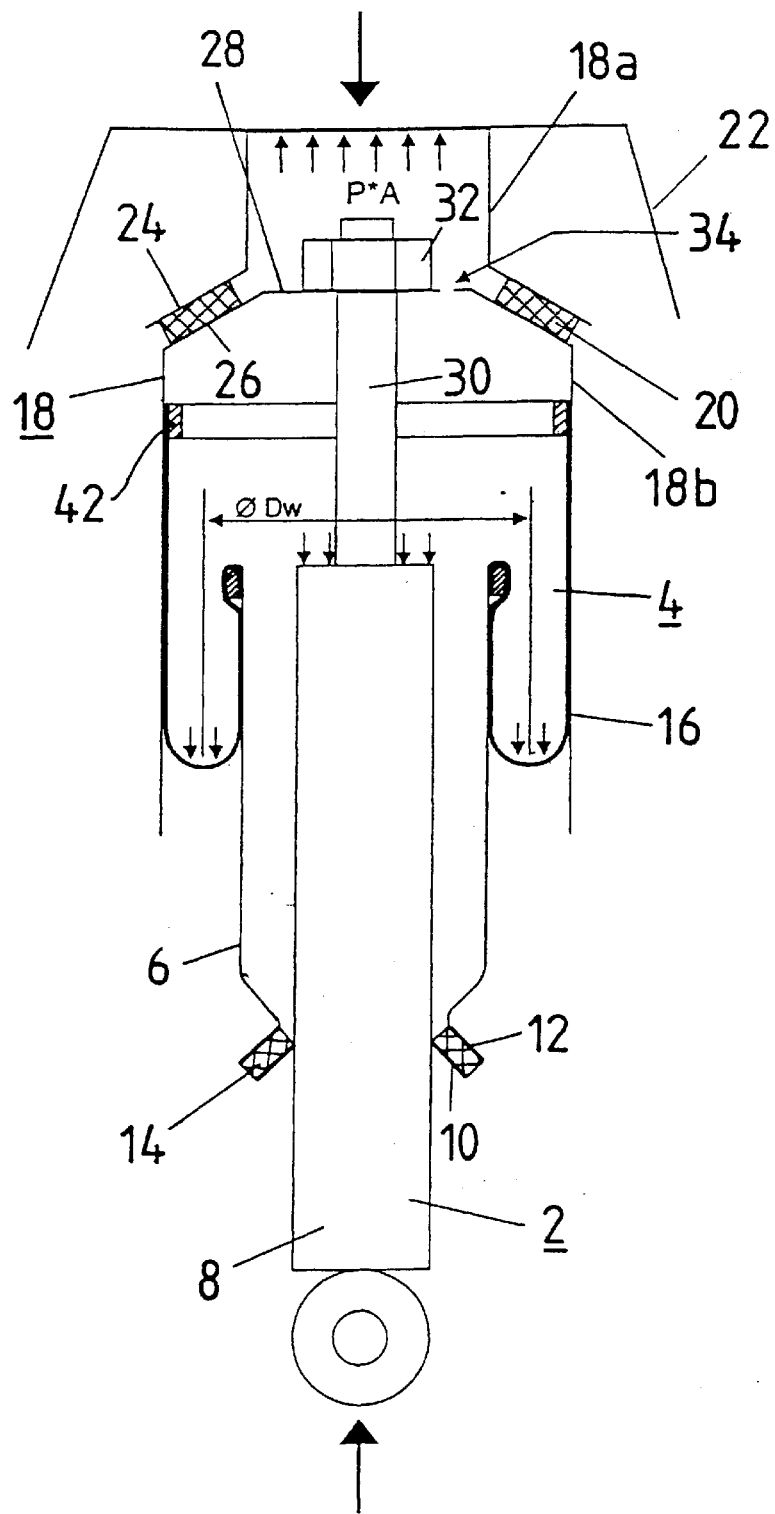
FIG. 1 shows an air spring strut.

FIG. 1 shows an air spring strut having a shock absorber 2 and an air spring 4. The roll-off piston 6 of the air spring supports itself on the cylinder 8 of the shock absorber 2 so as to permit a wobble movement. For this purpose, the cylinder 8 of the shock absorber 2 has a flange-like collar 10 and the roll-off piston 6 of the air spring 2 has a flange-like collar 12. An elastic bearing 14 is mounted between the collars (10, 12). At the upper end of the roll-off piston 6, the flexible member 16 of the air spring is attached which can roll off on the roll-off piston 6 while forming a rolling lobe. The flexible member 16 is attached to the housing 18 at the end lying opposite the roll-off piston 6. The flexible member 16 encloses an air volume which is closed off air-tight with respect to the atmosphere.

The housing 18 comprises two parts 18a and 18b of which the first part 18a provides the connection of the air spring 4 and therefore of the air spring strut to the chassis 22 of a motor vehicle. The connection can, for example, be provided by means of threaded fasteners (not shown). The second part 18b of the housing 18 serves for the attachment of the flexible member 16 of the air spring 4 and is preferably configured, at the same time, as an outer guide for the flexible member 16 of the air spring 4 as shown in FIG. 1 and the other figures. The attachment of the flexible member 16 to the second part 18 takes place, preferably, by means of a clamp ring 42. An annularly configured elastic bearing in the form of an elastomer component 20 is mounted between the first part 18a and the second part 18b of the housing 18. Preferably, the elastomer component 20 has approximately the form of an annularly-shaped cutout of a spherical surface as also shown in FIG. 1. The elastomer component 20 lies with a precise fit between the flange-shaped sections 24 and 26 of the housing parts 18a and 18b so that they lie air-tight one against the other.

The surface of the upper part 18a of the housing 18 faces toward the air volume of the air spring and is charged with the air pressure of the air volume of the air spring 4. The surface of the upper part 18a is pressure-effective in the longitudinal direction of the air spring strut and corresponds, with respect to its size, preferably approximately to the pressure-effective area of the air spring 4 (the diameter of the pressure-effective area of the air spring 2 is identified in FIG. 1 with $D_W$; the outer boundary line of the pressure-effective surface lies at the location at which the tangents on the flexible member 16 of the air spring run perpendicularly to the spring force or supporting force). In this way, it is ensured that the total wheel load force (indicated by the arrow above the chassis 22) is compensated by the force which the air pressure in the air volume of the air spring 4 applies to the pressure-effective area of the housing 18a aligned in the longitudinal direction of the air spring strut. The wheel load then does not act on the elastomer component 20.

Furthermore, the clear diameter of the elastomer component 20 corresponds approximately to the diameter of the pressure-effective cross-sectional area of the air spring 4 so that neither tensile nor compressive forces act on the elastomer component 20.

The housing part 18b of the housing 18 includes a cover 28 on which the piston 30 is attached with a threaded fastener 32. The piston 30 is insertable into the cylinder 8 of the shock absorber 2. The air spring 4 and the shock absorber 2 are journalled for wobble movement relative to the chassis 22 by the elastomeric component 20. Openings 34 are provided in the cover 28 of the housing part 18b and these openings make possible a pressure compensation of the air pressure on both sides of the cover 28. In this way, it is ensured that the surface of the housing part 18a, which is pressure-effective in the longitudinal direction of the air spring strut, is always charged with the air pressure in the air spring 2 and, in this way, this surface can support at least a part of the wheel load.

Figure 2:
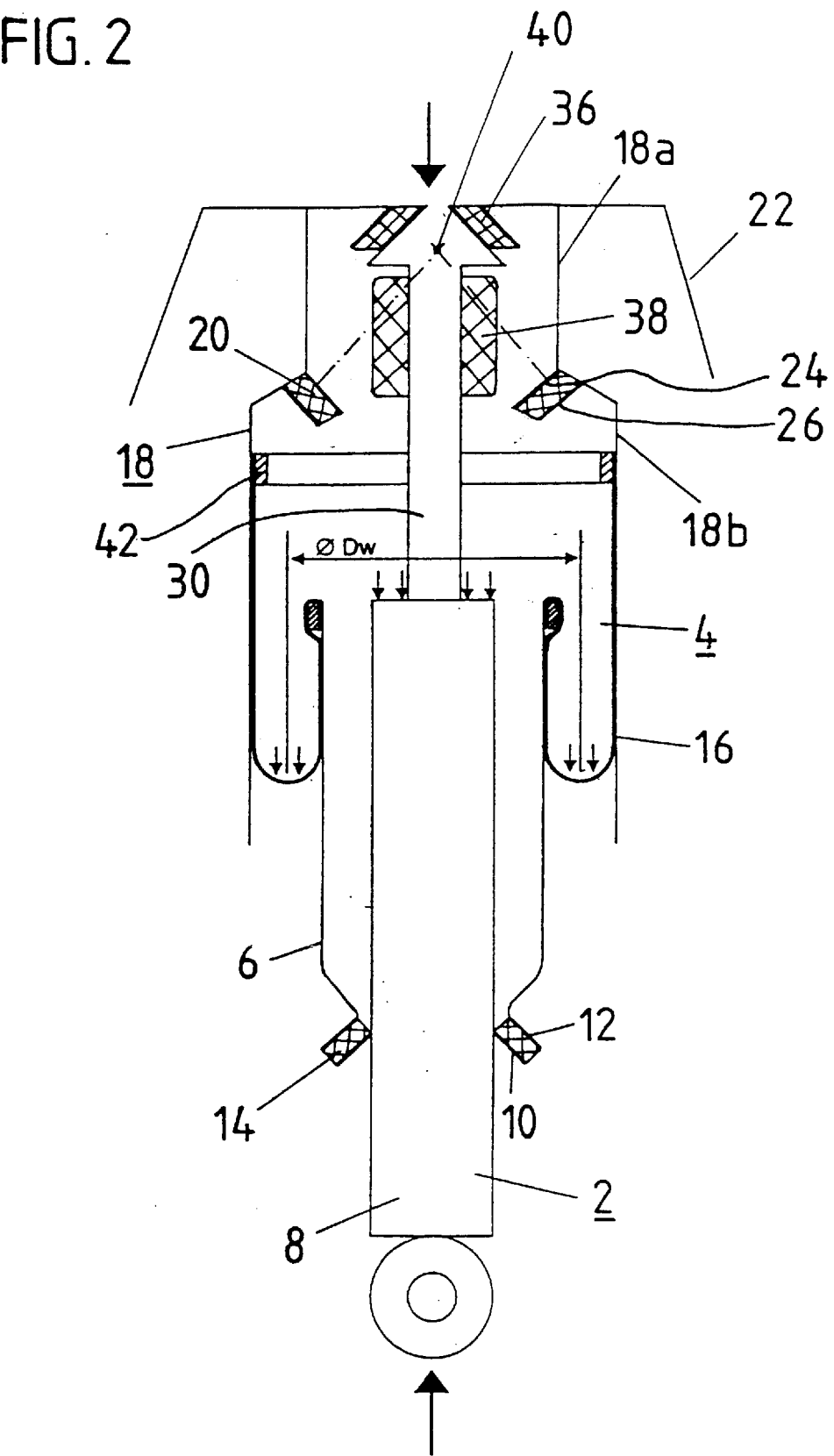
FIG. 2 shows an air spring strut.

FIG. 2 shows an air spring strut which is substantially configured as the air spring strut shown in FIG. 1. In the air spring strut, which is shown in FIG. 2, the housing part 18b, however, does not have a cover 28 on which the piston 30 of the shock absorber 2 is attached. Rather, the piston 30 is guided directly to the chassis 22 of the motor vehicle and is there supported relative to the chassis for wobble movement in the housing part 18a with the aid of elastomer components 36 and 38.

The annular elastic bearing is mounted between the two housing parts 18a and 18b and is in the form of an elastomeric component 20. In the embodiment shown in FIG. 2, this bearing also preferably has the form of an annularly-shaped section of a spherical surface and lies between flange-like sections 24 and 26 of the housing parts 18a and 18b. The elastomer component 20 is so aligned that the center point 40 of a spherical surface lies in the region in which the piston 30 of the shock absorber 2 is connected to the chassis. The spherical surface is completed starting from the ring-shaped bearing. In this way, it is ensured that the shock absorber 2 and the air spring 4 have wobble movement about the same point relative to the chassis 22 in the upper chassis-close region.

Figure 3:
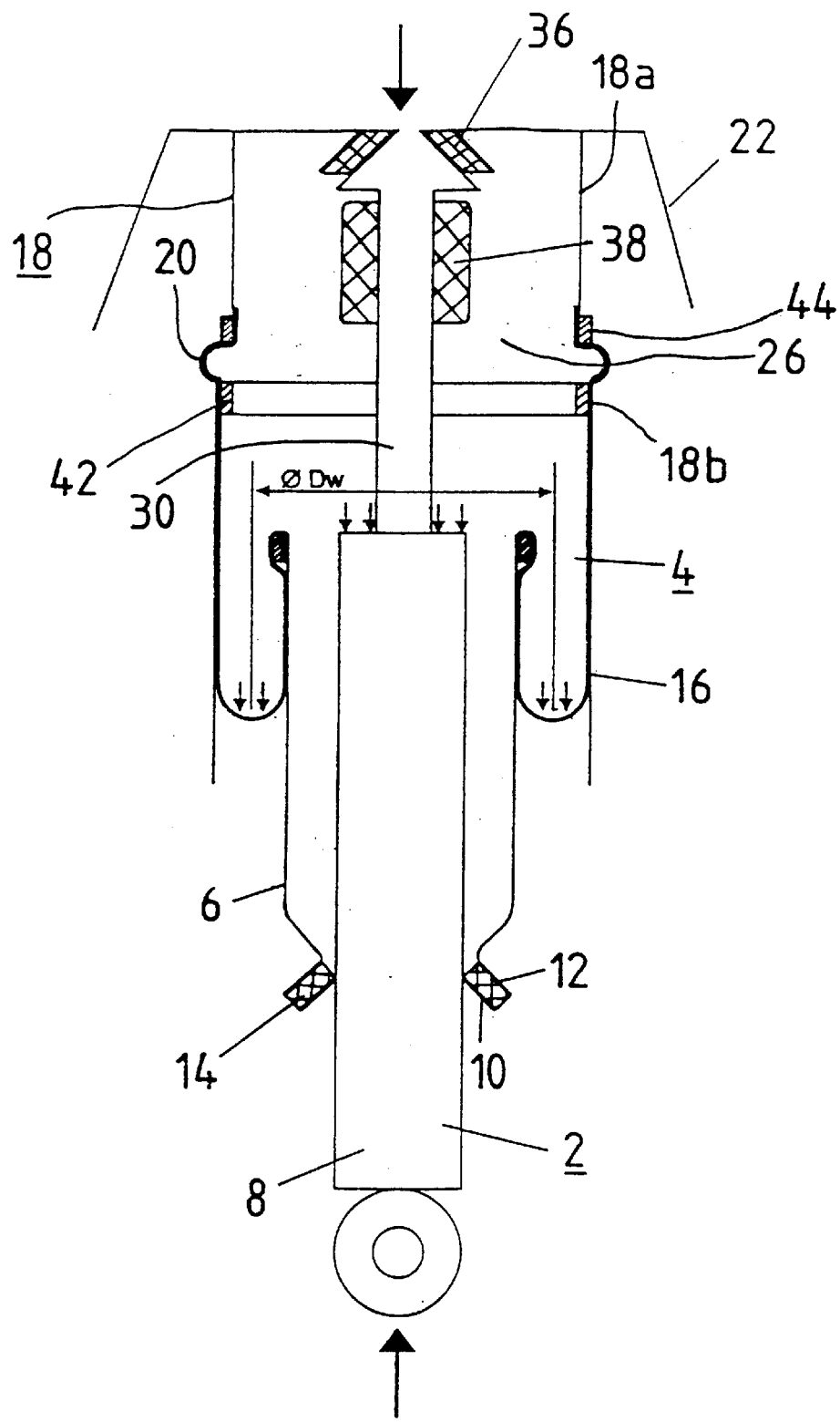
FIG. 3 shows an air spring strut.

FIG. 3 shows an air spring strut, which is configured substantially as the air spring strut shown in FIG. 2. Here too, the piston 30 is guided directly to the chassis 22 of the motor vehicle and is supported relative thereto with the aid of elastomeric components 36 and 38 for wobble movement in the housing part 18a.

The flexible member 16 is attached to the second part 18b of the housing 18 with the aid of the clamp ring 42 and at the end where the attachment lies, the flexible member projects beyond the second part 18b of the housing 18. The part of the flexible member 16, which projects beyond the housing part 18b, is attached with the aid of a clamp ring 44 to the housing part 18a. In the air spring strut, the housing parts 18a and 18b are so spaced from each other that a yielding part of the flexible member 16 remains between these housing parts and forms the elastic bearing 20. Because of the inner pressure of the air spring 4, this part of the flexible member 16 is expanded radially outwardly so that the form results, which is shown in FIG. 3. The air spring 4 is connected for wobble movement to the housing part 18a via the elastic bearing 20 (which is part of the flexible member 16) and is therewith connected to the chassis 22 of the motor vehicle.

| Reference List | |
| --- | --- |
| 2 | shock absorber |
| 4 | air spring |
| 6 | roll-off piston |
| 8 | cylinder |
| 10, 12 | flange-like collar |
| 14 | elastic bearing |
| 16 | flexible member |
| 18 | housing |
| 18a, 18b | part of housing 18 |
| 20 | elastomer component |
| 22 | chassis |
| 24, 26 | flange-like sections |
| 28 | cover |
| 30 | piston |
| 32 | threaded fastener |
| 34 | openings |
| 36, 38 | elastomer components |

| -continued | |
| --- | --- |
| Reference List | |
| 40 | center point |
| 42, 44 | clamp ring |

What is claimed is:

1. An air spring comprising:

a housing having first and second housing parts;

said first housing part being adapted for connecting said air spring to a chassis of a motor vehicle;

an elastic annular-shaped bearing mounted between said first and second housing parts;

a roll-off piston;

a flexible member enclosing an air volume under pressure and having a first end attached to said second housing part and a second end attached to said roll-off piston;

said housing having a surface facing toward said air volume and said surface being charged with said pressure;

said first and second housing parts having first and second flange-like sections; said elastic bearing having approximately the form of an annular-shaped section of a spherical surface and being mounted between said first and second flange-like sections; and, said elastic bearing is mounted between said first and second housing parts so as to cause the center point of the spherical surface, which is completed starting from said annular-shaped section, lies in the region wherein said piston of said shock absorber is connected to the chassis.

2. The air spring of claim 1, wherein said air spring has an effective diameter and said bearing having a diameter corresponding approximately to said effective diameter ($D_W$) of said air spring.

3. The air spring of claim 1, further comprising a shock absorber having a cylinder and a piston telescopically engaging said cylinder; said roll-off piston being supported on said cylinder; and, said piston of said shock absorber being connected to said second housing part.

4. The air spring of claim 1, further comprising a shock absorber having a cylinder and a piston for telescopically engaging said cylinder, said roll-off piston being supported on said cylinder; and, said piston of said shock absorber being connected to said chassis so as to allow a wobble movement.

5. The air spring of claim 1, wherein said elastic bearing is made from an elastomeric component.

\* \* \* \* \*

UNITED STATES PATENT AND TRADEMARK OFFICE
CERTIFICATE OF CORRECTION

PATENT NO.    : 6,742,775 B2
DATED         : June 1, 2004
INVENTOR(S)   : Holger Oldenettel It is certified that error appears in the above-identified patent and that said Letters Patent is hereby corrected as shown below:

Column 1,
Line 43, delete "a".
Line 57, delete "that".

Column 3,
Line 52, delete "spring 2" and substitute -- spring 4 -- therefor.

Column 4,
Lines 21 and 51, delete "spring 2" and substitute -- spring 4 -- therefor.

Column 5,
Line 22, delete "18*b* ," and substitute -- spring 18*b*, -- therefor.
Line 29, delete "results," and substitute -- results -- therefor.

Column 6,
Lines 14 and 24, delete "annular-shaped," and substitute -- annularly-shaped -- therefor.
Line 31, delete "annular-shaped section, lies" and substitute -- annularly-shaped section, to lie -- therefor.
Line 34, delete "having" and substitute -- has -- therefor.

Signed and Sealed this

Twenty-fourth Day of August, 2004

JON W. DUDAS
*Director of the United States Patent and Trademark Office*

UNITED STATES PATENT AND TRADEMARK OFFICE
CERTIFICATE OF CORRECTION

PATENT NO. : 6,742,775 B2
DATED : June 1, 2004
INVENTOR(S) : Holger Oldenettel

It is certified that error appears in the above-identified patent and that said Letters Patent is hereby corrected as shown below:

Column 1,
Line 43, delete "a".
Line 57, delete "that".

Column 3,
Line 52, delete "spring 2" and substitute -- spring 4 -- therefor.

Column 4,
Lines 21 and 51, delete "spring 2" and substitute -- spring 4 -- therefor.

Column 5,
Line 22, delete "18$b$ ," and substitute -- 18$b$, -- therefor.
Line 29, delete "results," and substitute -- results -- therefor.

Column 6,
Lines 14 and 24, delete "annular-shaped," and substitute -- annularly-shaped -- therefor.
Line 31, delete "annular-shaped section, lies" and substitute -- annularly-shaped section, to lie -- therefor.
Line 34, delete "having" and substitute -- has -- therefor.

This certificate supersedes Certificate of Correction issued August 24, 2004.

Signed and Sealed this

Ninth Day of November, 2004

JON W. DUDAS
*Director of the United States Patent and Trademark Office*